July 22, 1952     G. M. FOLEY ET AL     2,603,964
PARAMAGNETIC GAS ANALYZER
Filed March 31, 1949     3 Sheets-Sheet 1
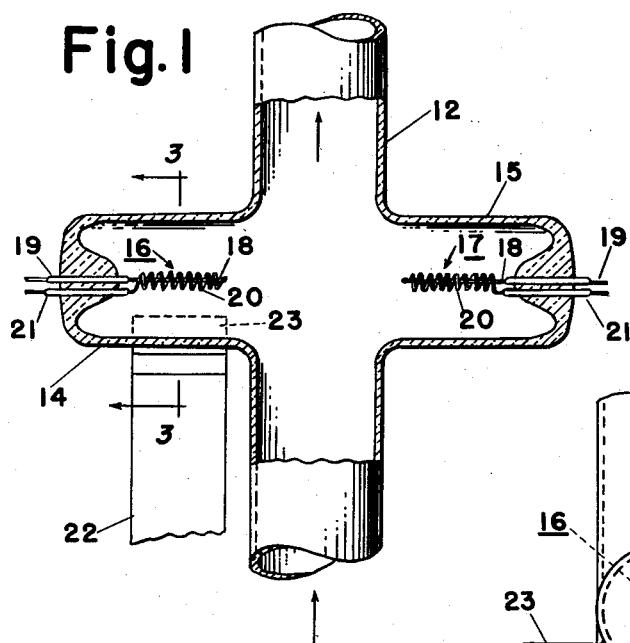
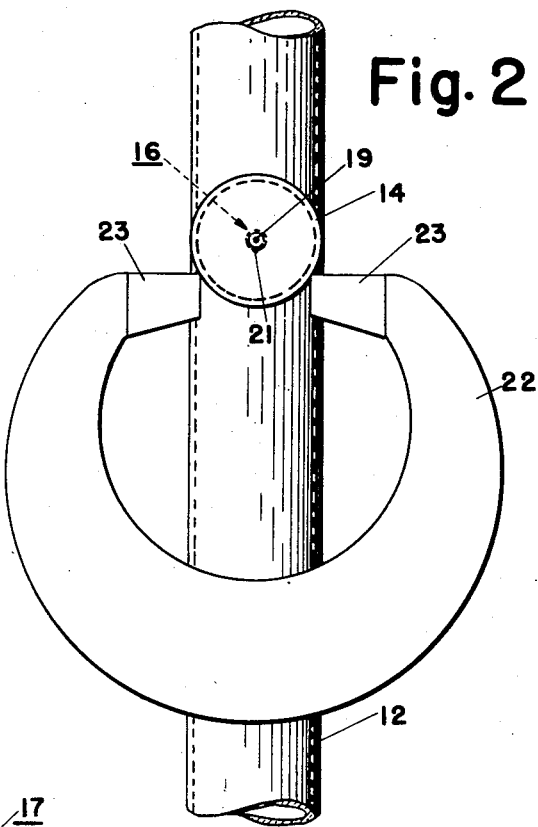
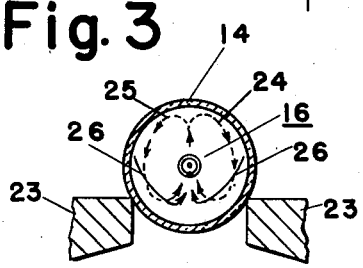
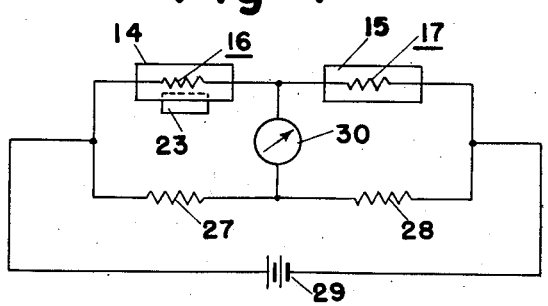
*INVENTORS*
GERARD M. FOLEY
ROBERT H. CHERRY
BY
*Woodcock and Phelan*
ATTORNEYS July 22, 1952 — G. M. FOLEY ET AL — 2,603,964
PARAMAGNETIC GAS ANALYZER
Filed March 31, 1949 — 3 Sheets-Sheet 2

INVENTORS
GERARD M. FOLEY
ROBERT H. CHERRY
BY Woodcock and Phelan
ATTORNEYS

July 22, 1952  G. M. FOLEY ET AL  2,603,964
PARAMAGNETIC GAS ANALYZER
Filed March 31, 1949  3 Sheets-Sheet 3

INVENTORS
GERARD M. FOLEY
ROBERT H. CHERRY
BY Woodcock and Phelan
ATTORNEYS

Patented July 22, 1952

2,603,964

UNITED STATES PATENT OFFICE 2,603,964

PARAMAGNETIC GAS ANALYZER

Gerard M. Foley, North Hills, and Robert H. Cherry, Glenside, Pa., assignors to Leeds and Northrup Company, Philadelphia, Pa., a corporation of Pennsylvania Application March 31, 1949, Serial No. 84,614

8 Claims. (Cl. 73—27)

This invention relates to gas analyzers, and particularly to analyzing apparatus for continuously determining the concentration in a vehicle gas of a component having a temperature coefficient of magnetic susceptibility.

The accurate measurement of the oxygen content of various gases used in or produced by industrial processes has become increasingly important with the expansion of the chemical, metallurgical and similar industries and with the increased interest in the efficiency of combustion in substantially all industrial combustion processes. Various oxygen analyzers have heretofore been proposed based upon chemical analysis or upon indirect measurement of some physical characteristic of the gas sample, but difficulties have been encountered in applying such analyzers to industrial processes.

It is known that although most gases are slightly diamagnetic, that is, are repelled by a magnetic field, a notable exception to this general rule is oxygen, which is highly paramagnetic: other gases including nitric oxide (NO) and nitrogen dioxide ($NO_2$) are also paramagnetic to significant, but lesser, extent. Furthermore, it is known that the mass susceptibility of paramagnetic gases, such as oxygen, varies inversely with the absolute temperature of the gas. It has been proposed to utilize the varying susceptibility with temperature to obtain, for analytical purposes, a sustained flow of paramagnetic gas, the rate of which is related to its concentration in the vehicle gas. Consequently, changes in the rate of flow, as measured by the change in resistance of a temperature-sensitive resistor, may be used as a measure of the concentration of the paramagnetic gas components, but the accuracy of such measurements is affected by the specific heat and viscosity of the vehicle gas. Other gas-analyzing devices heretofore developed taking advantage of paramagnetism have been used to but limited extent because insensitive, fragile or requiring quite elaborate auxiliary equipment.

In accordance with the invention, an elongated temperature-sensitive resistor is disposed lengthwise of a tubular gas cell and with its longitudinal axis offset or displaced from a surface defined by the lines of the field of maximum density between pole faces disposed on opposite sides of the cell and extending lengthwise thereof. In use of the cell, the axis of the resistor is substantially horizontal so that, due to heating effect of the resistor and cooling effect of the cell walls, gas which enters the cell, as from a flow tube, recirculates in convection loops of width corresponding with length of the resistor: the effect of the magnetic field upon the paramagnetic components in the cooler portion of each convection loop is to pull them toward the region of highest flux density and thus increase or decrease the circulation rate depending upon whether said pole pieces are above or below the axis of the resistor. In either event, the cooling effect of the circulating gas upon the temperature-sensitive resistor is a function of the concentration of its paramagnetic component. Thus, the concentration may be determined from the measurement of the resistance of the temperature-sensitive resistor.

In accordance with one system embodying the invention, two similar cells and resistor elements may be employed and the magnetic field applied to only one of the cells, the resistor elements being connected in a balanceable network, such as in adjacent arms of a Wheatstone bridge circuit, so that the effect of variables other than the concentration of the paramagnetic gas in the cells is minimized.

In accordance with another form of the invention, two similar cells with oppositely disposed magnetic fields are employed so that the magnetic convection currents produced in the respective cells will in one cell assist, and in the other cell oppose, the thermal-convection currents of the gas in the cells. Thus, the two cells have a cumulative effect upon the degree of unbalance of the bridge with consequent enhancement of the sensitivity of the apparatus.

In accordance with a further embodiment of the invention, a bridge circuit of either of the above types may be used in conjunction with a second bridge circuit of either of the above types but having gas-analyzing cells containing a standard gas similar to the vehicle gas and subjected to the same pressures and temperatures but having a known oxygen content. The ratio of the unbalances of the two bridge circuits may then be measured and with such arrangement the effects of changes in conditions other than the paramagnetic content are quite completely compensated.

For a more detailed understanding of the invention, reference may be made to the drawings in which:

Fig. 1 is an elevational view, partly in section, of a cell assembly embodying the present invention;

Fig. 2 is a side elevational view of the assembly shown in Fig. 1;

Fig. 3 is a sectional view taken along the line 3—3 of Fig. 1;

Fig. 4 is a circuit diagram of a gas-analyzing system using the cell assembly in Figs. 1 to 3;

Figure 5:
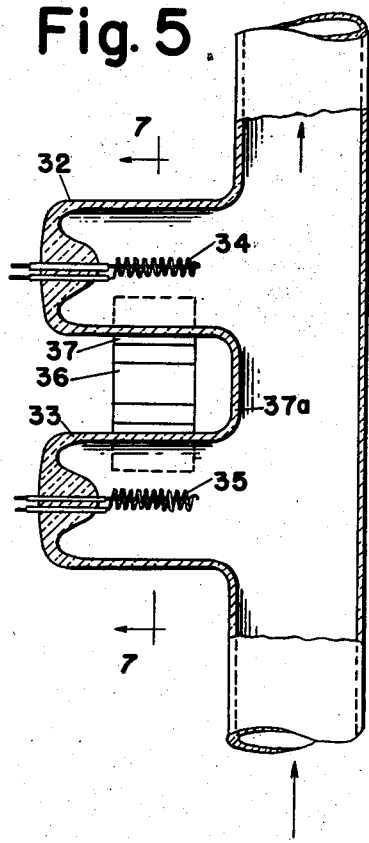
Fig. 5 is an elevational view of another cell assembly embodying the invention.

Referring to Figs. 1 to 4, the invention has been shown as embodied in a gas-analyzing device comprising a flow pipe 12 provided with two horizontally extending gas cells 14 and 15. The flow pipe 12 and the cells 14 and 15 may be formed of any suitable non-magnetic material, preferably glass or similar non-corrosive, non-magnetic material. Each of the cells 14, 15 is provided with a thickened end wall for respectively supporting in horizontally disposed relation a heat-sensitive resistor, 16 or 17. The resistor elements 16 and 17 may be formed of any suitable resistor material having a suitably high temperature coefficient of resistance and may be of any desired configuration. As shown, each resistor comprises a central conductor 18 extending from, or a continuation of, terminal lead 19 and a coil portion 20 connected to the inner end of conductor 18 and to a second terminal lead 21. In a preferred embodiment, the resistor elements 16 and 17 are formed of fine platinum wire. The inner conductor 18 may be coated with glass or other material having suitable electrical and thermal properties rigidly to support the coil-conductor 20 which may be similarly coated. In both cases, the coating may be of a nature suited to protect the conductor from corrosion or to preclude heat-exchange between the resistor and gas resulting from chemical reaction or sorption processes. Specifically, the coil 20 may be 100 turns of 1 mil wire spaced 1¼ mils apart and having an inner diameter of 14 mils.

Figure 3A:
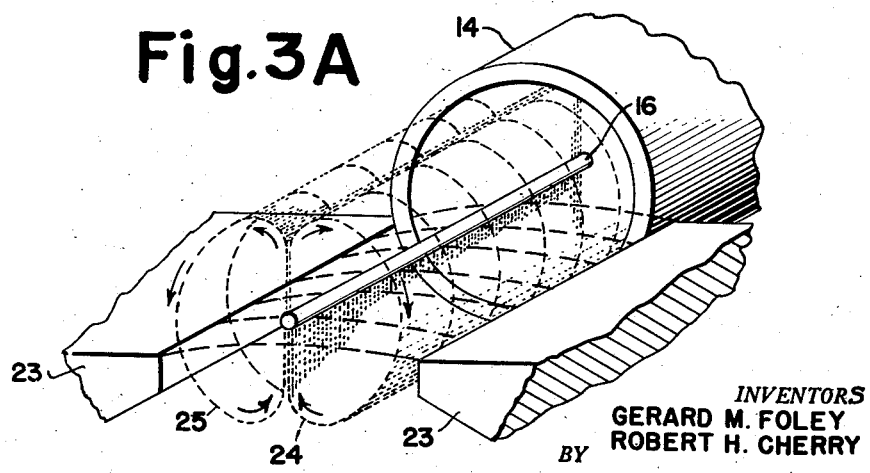
Fig. 3A is an explanatory figure referred to in discussion of Figs. 1 to 3.

As shown in Figs. 1 and 2, the gas cell 14 is provided with a magnet 22, preferably a permanent magnet of material having high coercivity, such as "Alnico V." The pole pieces 23 of the magnet are preferably slightly wedge-shaped, as shown in Figs. 2 and 3, and of width approximating the length of resistor 16. The magnet 22 is supported so that the opposed pole pieces 23 are disposed on opposite sides of the cell 14 to provide a strong magnetic field extending in direction transversely of the longitudinal axis of the resistor element 16 and are shaped to provide a steep magnetic gradient in a direction perpendicular to both the longitudinal axis of the resistor element 16 and to the lines of maximum magnetic field which is in a region substantially parallel to but offset from a horizontal plane through the resistor element. The lines of the field of greatest magnetic intensity define a surface, Fig. 3A, terminating at the pole pieces and offset from the longitudinal axis of the elongated resistor: specifically in Figs. 1 to 3, the region of greatest density of the magnetic field is appreciably below the axis of resistor 16.

When the resistor elements 16 and 17 are heated by the flow of current therethrough, thermal-convection currents are set up within the gas which has diffused from flow pipe 12 into the cells 14 and 15. These convection currents flow in wide bands in paths whose cross-section is indicated by the broken arrows 24, 25 in Fig. 3. Each of the convection currents shown may roughly be visualized as a horizontally disposed sleeve or tube rotating about an axis laterally displaced from the axis of the resistor.

In cell 14, the cooling effect of the thermal-convection currents is increased due to the accelerating effect of the magentic field between the pole pieces 23 upon the cooled para-magnetic portion of the convection loop. As heretofore explained, the mass susceptibility of a paramagnetic gas, such as oxygen, varies inversely as its temperature: consequently, the cooler paramagnetic gases adjacent the walls of the cell 14 are, generally as indicated by arrows 26, attracted downwardly toward the zone of maximum magnetic force and directed by the lower wall of cell 14 into the vicinity of the heated resistor 16 whereupon their magnetic susceptibility rapidly decreases, and consequently they are not attracted back toward said zone until cooled by the cell walls.

The magnetic component of flow thus produced is a function of the concentration of the paramagnetic gas in the vehicle gas, and since this flow component, in Figs. 1 to 3, is in a direction to augment the cooling effect of the thermal-convection currents in cell 14, the resistor element 16 will be cooled to a temperature below the temperature of the resistor element 17 which is subjected only to the thermal-convection currents. The resistances of the two resistors 16, 17 differ by an amount which is directly related to the concentration of the paramagnetic gas and which is substantially independent of other variables, such as ambient temperature of the cell, specific heat and viscosity of the vehicle gas.

In order to measure the paramagnetic content of the vehicle gas passing through flow channel 12, the resistor elements 16 and 17 of cells 14 and 15 may be connected in adjacent arms of a Wheatstone bridge, Fig. 4, the other arms of which include the resistors 27 and 28. The bridge circuit may be energized from any suitable source of direct or alternating current, generically represented by battery 29. The measuring means generically represented by galvanometer 30 may take any desired form depending upon whether it is desired to indicate or to record the oxygen concentration or whether it is desired to exercise control functions automatically to adjust the oxygen content. By way of example, the instrument 30 may be a sensitive indicating voltmeter or deflection galvanometer; for recording, there may be used the apparatus disclosed in Squibb Patent 1,935,732, the unbalance voltage of the bridge of Fig. 4 hereof being applied to the circuit of Fig. 15 of Squibb in lieu of the output of thermocouple 45. As another example of a suitable indicating or recording system for measuring unbalance, reference is made to Perley et al. Patent 2,422,129. A null balancing method may be employed by using the aforesaid Squibb apparatus to effect rebalancing adjustment of variable resistance in either or both arms 27, 28 of the bridge (Fig. 4).

In the apparatus of Figs. 1 to 4, it is to be noted that for each and every increment of length of the elongated resistor 16, the induced thermal magnetic flow is transverse or normal to the long axis of the resistor.

The aforesaid position of the heater with respect to the pole pieces and the relation between the magnetic lines of greatest intensity and the convection loops are clearly shown in Fig. 3A. As shown by the broken lines, the high intensity flux lines between the pole pieces 23, 23 define a sheet or surface equally offset from the resistor 16 throughout the length thereof and cutting across the wide convection loops 24, 25 throughout their length as measured in the direction of the axis of the resistor.

The sensitivity of devices so constructed and operated is as much as five times as great as can be obtained by analyzer devices in which the circulation is effected by an elongated vertical heater and pole pieces adjacent an end of the heater.

In the embodiment of the invention shown in Figs. 5 to 8, a flow tube 31 is provided with a pair of similar gas cells 32 extending horizontally therefrom in side-by-side relation with similar temperature-sensitive elements 34, 35 respectively disposed therein. As shown best in Fig. 6, a permanent magnet 36 is provided with pairs of pole pieces 37 and 37a, the pole pieces 37, 37 being arranged to produce a transverse magnetic field below but substantially parallel to a horizontal plane through the resistor element 34 and the pole pieces 37a, 37a being arranged to produce a similar magnetic field which is disposed above the resistor element 35.

Figure 7:
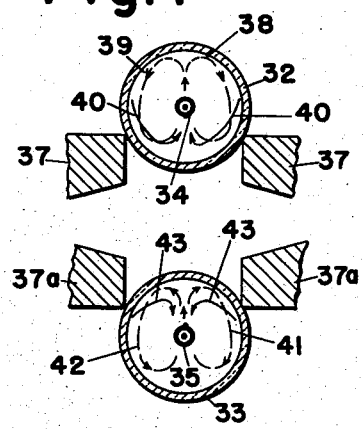
Fig. 7 is a fragmentary sectional view taken along line 7—7 of Fig. 5.

As shown in Fig. 7, the thermal-convection currents induced in the cell 32 by heating of the resistor element 34 (represented by the broken line arrows 38 and 39) are augmented or assisted by magnetically-induced paramagnetic components of flow (represented by the solid line arrows 40), directed by the lower wall of cell 32 toward the resistor element 34 so that there is afforded an increased cooling of the resistor element 34 which is in proportion to the paramagnetic content of the gas being analyzed. On the other hand, the thermal-convection currents in the cell 33 (represented by the broken line arrows 41 and 42) are opposed by magnetically induced paramagnetic components (represented by the arrows 43) as directed by the upper wall of cell 33 toward resistor element 35 and consequently the cooling effect on the resistor element 35 of the thermal-convection currents 41 and 42 is decreased in proportion to the paramagnetic gas content of the gas being analyzed.

Figure 6:
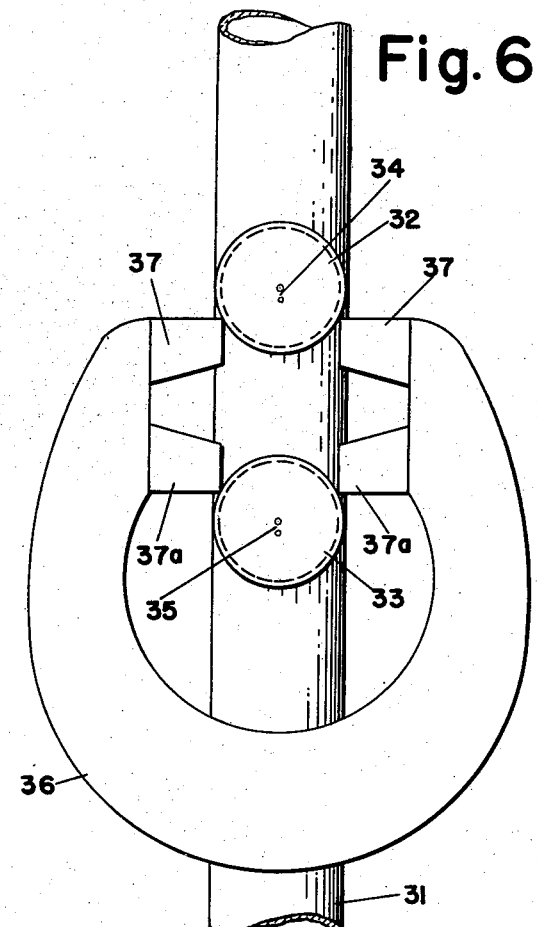
Fig. 6 is a side elevational view of the assembly shown in Fig. 5.
Figure 8:
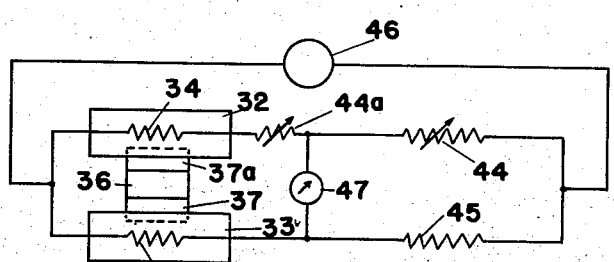
Fig. 8 is a circuit diagram of a gas-analyzing system using the cell assembly of Figs. 5-7.

In Fig. 8, the gas cells 32 and 33 of Figs. 5 to 7 are shown diagrammatically with their respective resistor elements 34 and 35 connected in adjacent arms of a bridge circuit which includes additional resistors 44, 44a and 45. The bridge circuit is energized from a suitable source of heating current, direct or alternating, generically represented by battery 46. Since the temperatures, and consequently the resistances, of the elements 34 and 35 in the cells 32 and 33 are varied in opposite sense in accordance with the paramagnetic gas content, there occurs an approximate doubling of the unbalance of the bridge circuit for a given gas content: the sensitivity may be quadrupled by an additional second pair of thermally-sensitive resistors of another cell assembly, such as shown in Figs. 5-7, in the two remaining arms of the bridge. The unbalance may be measured and the corresponding concentration indicated, recorded or controlled by a suitable instrument 47. It will be understood that the gas cells 32 and 33 of Figs. 5 to 8 may be disposed in alignment with each other on opposite sides of the flow tube, as in Fig. 1, in which case separate magnets may be employed respectively disposed below and above the axes of the gas cell resistors to provide the desired thermomagnetic flow; the arrangement disclosed in Figs. 5, 6 and 7 is, however, preferable in that only one magnet 36 is required.

In all modifications, permanent magnets, rather than electromagnets, are preferred because a magnetic field of constant density is insured without the complexities of current stabilization or artificial cooling. However, direct-current or alternating-current electromagnets may be used.

Assuming identical thermal characteristics of cells 32, 33, the effects of changes in common variables, such as ambient temperature and pressure and composition of the vehicle gas, balance out. To attain this balance despite unavoidable constructional differences between the cells of a pair, resistors 44 and 44a are adjusted, as by the manufacturer in accordance with the disclosure of our copending application Serial No. 200,828, to obtain the ratio of heating currents for which there is no change in unbalance by said common variables, and then the resistors are complementarily varied to balance the bridge, the complementary variation of resistors 44, 44a maintaining constant the sum of their resistances.

Figure 9:
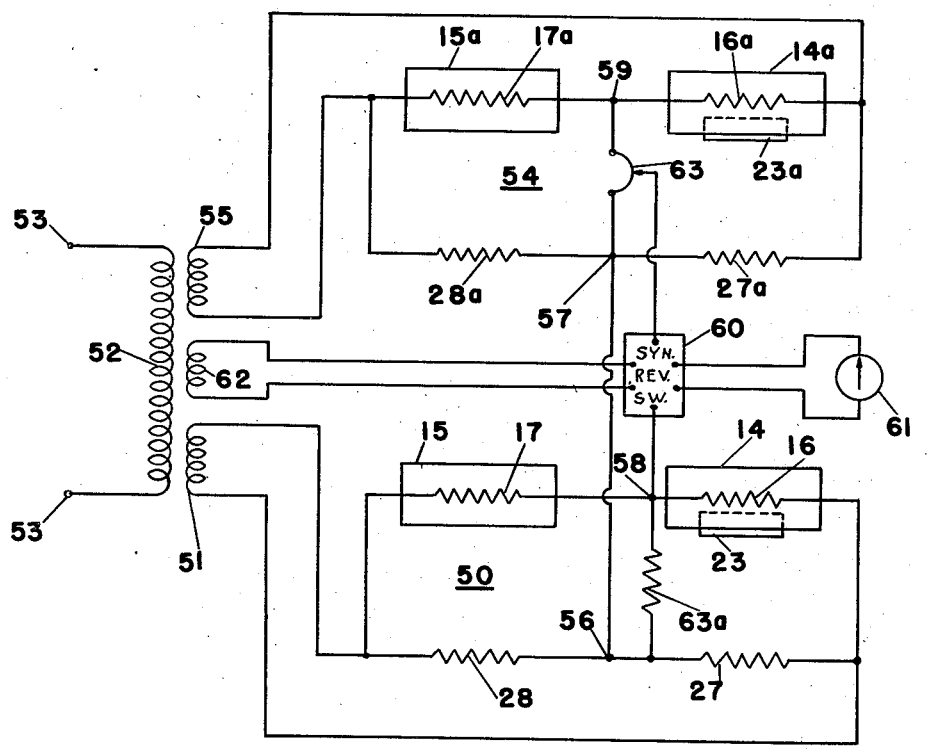
Fig. 9 is a circuit diagram of another gas analyzing-system embodying the invention.

Although apparatus embodying the invention as thus far described provides a first order compensation for variations of ambient temperatures and pressures and of thermal conductivity of the gas, more complete compensation may be obtained with the system of Fig. 9. In this modification, in addition to bridge circuit 50 which may be similar to that of Figs. 4 or 8, there is a second circuit 54. The gas cells 14 and 15 of bridge 50 are supplied with gas to be analyzed and the corresponding cells 14a and 15a of the bridge circuit 54 are supplied with a standard gas of predetermined paramagnetic content and subjected to the same pressure and temperature conditions as the gas in cells 14 and 15. In general, the elements of network 54 are identified by the same reference characters, plus the suffix a, as the corresponding elements of network 50.

The bridge circuits 50, 54 may be respectively energized from the secondary windings 51, 55 of a transformer whose primary winding 52 is connected to a source of alternating-current represented by terminals 53.

The ratio of the unbalances of two bridge circuits 50, 54 constitutes a measure of the paramagnetic content of the gas being analyzed in cells 14 and 15 as compared to the known paramagnetic concentration in the cells 14a and 15a. To measure this ratio, the two bridges 50 and 54 have their corresponding points 56 and 57 thereof connected together. The connection from the point 59 in the bridge 54 to one terminal of a synchronous reversing switch 60 is made through an adjustable potentiometer or slidewire 63 and connection from point 58 of bridge 50 is made to the other terminal of switch 60. The synchronous reversing switch 60 may be of a type well known in the art with commutating contacts adapted to be synchronously driven from the source 53 of alternating current as through a third secondary winding 62 associated with the primary winding 52.

With rectifier 60 used, the instrument 61 may be of any suitable direct-current type and if desired may constitute the galvanometer of a self-balancing recorder of the type disclosed in the aforesaid Squibb Patent No. 1,935,732, in which event the recorder apparatus may be utilized automatically to effect rebalancing adjustment of the slidewire 63 in accordance with the movements of the galvanometer needle, as fully described in the said Squibb patent. The ratio of the unbalances of the two bridges may be measured in other ways: for example, the rectifying switch 60 may be omitted and an alternating-current galvanometer connected between points 58 and the movable contact of resistor 63.

Apparatus embodying the present invention is adapted for analyzing gases of relatively low oxygen content, for example, less than five per cent; it may also be employed for analysis of gases with high oxygen content.

Where standard gas other than air is employed in the cells 14a and 15a and the gas in cells 14, 15 operates at atmospheric pressure, the cells 14a, 15a are preferably provided with slack diaphragms or "sylphons" for maintaining them sealed while at the same time providing atmospheric pressure conditions therein: if the standard gas is air and cells 14, 15 operate at atmospheric pressure, the flow pipes of cells 14a, 15a may be left open to atmosphere: where operation is at other than atmospheric pressures, a pressure-equalizer, such as a slack diaphragm, should be connected between the two flow pipes.

The cells herein disclosed and claimed may also be used in isothermal bridge arrangements such as disclosed for example in our copending application Serial No. 186,832, filed September 26, 1950.

While particular embodiments of the invention have been shown, it will be understood that the invention is not limited thereto but comprehends modifications and changes within the scope of the appended claims.

What is claimed is:

1. An analyzer for determining the paramagnetic content of a gas comprising at least one tubular cell for receiving said gas, an elongated, heated temperature-sensitive resistor disposed longitudinal in said cell with the long axis thereof in a substantially horizontal plane, the walls of said cell defining a boundary for flow of thermal-convection currents produced by heating of said resistor, and magnetic means for producing a magnetic field whose lines of maximum intensity define a substantially horizontal plane which intersects opposite walls of said cell and which is offset from the axis of said resistor to produce magnetic-convection currents of the gas in a path substantially coincident with said thermal-convection currents of the gas.

2. An arrangement as in claim 1 in which the magnetic means is so disposed that the plane of maximum field intensity is offset below the axis of said resistor to effect flow of said thermal-convection and magnetic-convection currents in the same direction in their coincident paths.

3. An arrangement as in claim 1 in which the magnetic means is so disposed that the plane of maximum field intensity is offset above the axis of said resistor to effect flow of said thermal-convection and magnetic-convection currents in opposite directions in their coincident paths.

4. An arrangement as in claim 1 comprising two cells, each as therein defined, the planes of maximum field intensity for the two cells being respectively offset above and below the axes of the resistors to produce in the respective cells magnetic-convection currents which respectively flow in the same direction and in the opposite direction to the thermal-convection currents, and an electrical network including said resistors of the cells in such branches thereof that their resistance changes, due to aforesaid thermal-convection and magnetic-convection currents, cumulatively effect unbalance of the network.

5. An arrangement as in claim 4, in which the resistors of the two cells are connected in adjacent arms of a bridge network.

6. An arrangement as in claim 1 comprising two cells, each as therein defined, said cells being respectively traversed by gas of predetermined paramagnetic content and gas to be analyzed, the resistors of said cells being respectively disposed in different bridge networks, and electrical means for measuring the ratio of the outputs of said bridge networks.

7. An arrangement as in claim 1 including a second cell similar except for omission of the magnetic means, both of said cells being traversed by the gas to be analyzed and the resistors of said cells being connected in adjacent arms of a bridge network to provide an output which is directly related to concentration of the paramagnetic component of the gas and substantially independent of other variables such as specific heat and viscosity of the gas, and ambient temperature.

8. An arrangement as in claim 6 additionally including two compensating cells similar to the first two cells, except for omission of the magnetic means, respectively disposed in said bridge networks and each respectively traversed by the same gas that traverses that one of the first two cells included in the same bridge network.

GERARD M. FOLEY.
ROBERT H. CHERRY.

REFERENCES CITED

The following references are of record in the file of this patent:

UNITED STATES PATENTS

| Number | Name | Date |
|---|---|---|
| 2,501,377 | Cherry | Mar. 21, 1950 |

FOREIGN PATENTS

| Number | Country | Date |
|---|---|---|
| 570,781 | Germany | Aug. 17, 1942 |
| 724,041 | Germany | Feb. 20, 1933 |
| 60,881 | Denmark | May 3, 1943 |
| 64,957 | Denmark | Oct. 28, 1946 |
| 71,454 | Norway | Dec. 30, 1946 |

OTHER REFERENCES

"Research on the Behavior of Paramagnetic Gases in the Non-Homogeneous Magnetic Field," by F. Klauer, E. Turowski, and T. Von Wolff appearing in "Communication from Scientific Laboratories of Auer Company," Berlin, Germany, July 1941.